United States Patent [19]
Brookes et al.

[11] Patent Number: 4,892,400
[45] Date of Patent: Jan. 9, 1990

[54] TOWING MIRROR

[75] Inventors: Geoffrey S. Brookes, Kidderminster; George J. Wyers, Coseley, both of England

[73] Assignee: Blazer International Corporation, Franklin Park, Ill.

[21] Appl. No.: 258,559

[22] Filed: Oct. 17, 1988

[51] Int. Cl.$^4$ ................................................ G02B 5/08
[52] U.S. Cl. ..................................... 350/626; 350/632
[58] Field of Search ........................ 350/626, 632, 635; 248/473, 477, 481

[56] References Cited

U.S. PATENT DOCUMENTS

| 3,048,084 | 8/1962 | Iannuzzi . | |
| 3,790,117 | 2/1974 | Winkler | 248/481 |
| 4,111,532 | 9/1978 | Budish | 350/307 |
| 4,664,489 | 5/1987 | Karns | 350/631 |

FOREIGN PATENT DOCUMENTS

| 0636757 | 12/1963 | Belgium | 350/631 |
| 1254493 | 11/1967 | Fed. Rep. of Germany . | |
| 3516317 | 11/1986 | Fed. Rep. of Germany . | |
| 120430 | 9/1981 | Japan . | |

OTHER PUBLICATIONS

One sheet entitled, "Summit Elite Towing Mirror" and consisting of three figures prepared at the request of applicants' attorney to illustrate a towing mirror believed to be marketed in Europe by G. Doherty Limited, Unit 1-3, Overfield, Thorpe Way, Banbury, Oxon OX168XR, England.

*Primary Examiner*—Bruce Y. Arnold
*Assistant Examiner*—Jay Patrick Ryan
*Attorney, Agent, or Firm*—Willian, Brinks, Olds, Hofer, Gilson & Lione

[57] ABSTRACT

An auxiliary external rearview mirror apparatus which is adapted to be mounted to existing external vehicle mirrors of substantially any size or shape to provide the driver or other occupant of the vehicle with an enhanced view of the roadway. The auxiliary external mirror apparatus comprises an auxiliary mirror member, first and second support arms for mounting the auxiliary mirror member to an existing external mirror member of a vehicle, and securing means adapted to extend around the back side of the existing mirror member from the first support arm to the second support arm to secure the auxiliary mirror apparatus to the existing mirror member without covering the existing mirror to any significant extent. The auxiliary mirror apparatus is of streamlined shape and extends from the existing mirror member along substantially the same line that the existing mirror member extends from the vehicle. The auxiliary mirror member includes a back surface which is adapted to face forwardly when the apparatus is mounted to a vehicle and which is angled generally outwardly and rearwardly relative to the vehicle such that the oncoming wind impinging thereagainst during movement of the vehicle will be directed generally outwardly and rearwardly from the vehicle to reduce vibration of the auxiliary mirror or of the existing mirror to which it is mounted.

16 Claims, 2 Drawing Sheets

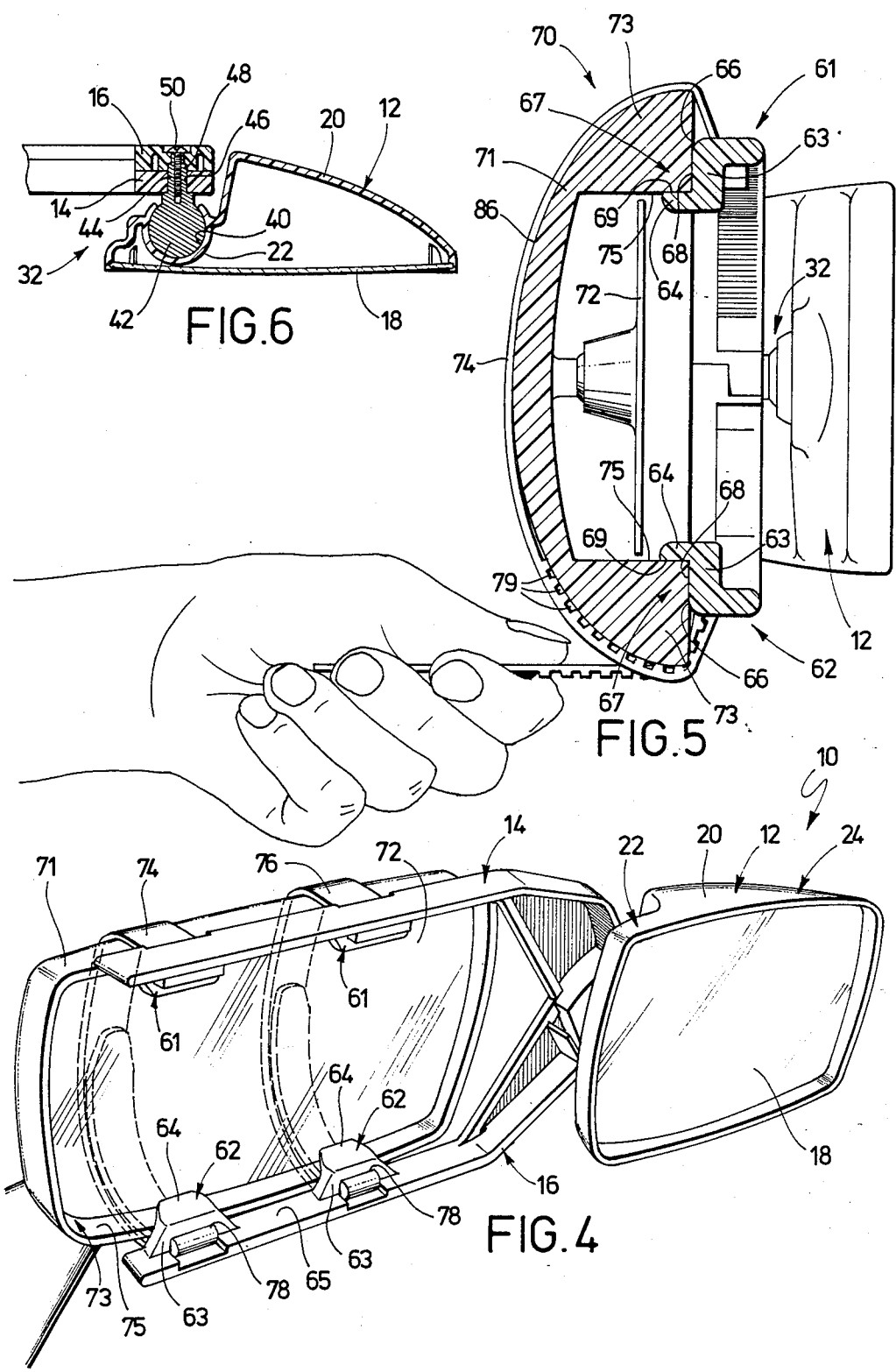

TOWING MIRROR

BACKGROUND OF THE INVENTION

The present invention relates to an auxiliary rearview mirror for vehicles; and, in particular, to an auxiliary rearview mirror which is adapted to be mounted to an existing external mirror of a vehicle to provide the driver or other occupant thereof with an enhanced view of the roadway.

When a vehicle is used to tow a trailer, boat or other load, the external rearview mirror or mirrors normally provided on the vehicle is often not satisfactorily positioned or capable of being sufficiently adjusted to provide a clear view of the roadway behind or along side of the load. In such circumstances, auxiliary external rearview mirrors, often referred to as "towing mirrors" are commonly used. Such mirrors typically extend further outwardly from the side of the vehicle than the existing external mirror to provide an unobstructed view of the roadway behind or along side the load.

Many known auxiliary rearview mirrors are designed to be mounted directly to an existing external mirror of the vehicle. Often, the mounting structure of the auxiliary mirror covers the existing mirror and prevents the existing mirror from also being used when the auxiliary mirror is installed. See, for example, German Ausleges-chrift No. 1,254,493 and U.S. Pat. No. 4,111,532. Some auxiliary mirrors are designed to clampingly engage opposite edges of the existing mirror structure or are otherwise mounted to the existing mirror structure in a manner which permits the existing mirror to also be used. See, for example, U.S. Pat. Nos. 3,048,084 and 3,790,117. In such designs, however, the clamping structure can scratch the painted surface of the existing mirror housing or otherwise damage the existing mirror structure.

One problem that is often encountered when using an auxiliary external mirror is that of vibration. Specifically, many auxiliary mirrors are designed to extend substantially laterally outwardly from the side of the vehicle and have a generally flat, forwardly facing back surface that substantially directly faces the oncoming wind during movement of the vehicle. The resistance of the auxiliary mirror to the force of the oncoming wind can result in substantial vibration of the auxiliary mirror preventing the driver or other occupant of the vehicle from obtaining a clear image through the mirror. When the auxiliary mirror is mounted to an existing external mirror, the resulting vibration can also be transmitted to the existing mirror preventing its effective use as well. The substantial force of the oncoming wind against the back surface of the mirror can also weaken and eventually break the auxiliary mirror and/or the existing mirror structure to which it is mounted.

In an effort to reduce the vibration problem, some prior auxiliary mirror systems include brace members or other structure to mount be auxiliary mirror to the vehicle at a plurality of locations. See, for example, U.S. Pat. No. 4,664,489. Such auxiliary mirror designs tend to be relatively complex and more difficult to install, and, generally, are rather unattractive in appearance.

Also, many known auxiliary external mirrors, particularly those which are adapted to be attached to an existing external mirror of a vehicle, are limited in their ability to be used on the many vehicle makes and models in the marketplace. Specifically, in most vehicles, the existing external mirrors are mounted within mirror housings which vary greatly in size and shape depending on the make and model of the vehicle; and many known auxiliary external mirrors cannot be properly fitted to many of the housing styles.

SUMMARY OF THE INVENTION

The present invention is an auxiliary external rearview mirror apparatus which is adapted to be mounted to an existing exteral mirror member of a vehicle to provide the driver or other occupant of the vehicle with an enhanced view of the roadway. The existing external mirror member includes a mirror side having an existing mirror, and a back side, and the auxiliary external mirror apparatus of the invention comprises an auxiliary mirror member, first and second support arms extending from the auxiliary mirror member for mounting the auxiliary mirror member to an existing external mirror member on a vehicle, the first and second support arms being adapted to engage the mirror side of the existing mirror member on opposite sides of the existing mirror, and securing means adapted to extend around the back side of the existing mirror member from the first support arm to the second support arm to secure the auxiliary mirror apparatus to the existing mirror member. The first and second support arms each include a first side which is adapted to face the mirror side of the existing mirror member when the support arms are mounted to the existing mirror member, and first and second projections which extend from the first and second support arms, respectively, for engaging the mirror side of the existing mirror member on opposite sides of the existing mirror. The projections each include a depending portion which extends outwardly from its respective support arm and an extending portion which extends outwardly from the depending portion beyond the first side of the support arm to define generally L-shaped seats for engaging the mirror side of the existing mirror member on opposite sides of the existing mirror.

In accordance with the invention, the generally L-shaped seats defined by the first and second projections are adapted to engage and seat the annular rim of the housing which supports most existing external mirrors above and blow the existing mirror without covering the existing mirror to any significant extent. The securing means is adapted to extend around the back side of the existing mirror member from the first support arm to the second support arm to secure the auxiliary mirror apparatus to the existing mirror member, also without covering the existing mirror, to thus provide the driver or other occupant of the vehicle with use of both the existing mirror and the auxiliary mirror mounted thereto.

In accordance with a presently preferred embodiment of the invention, the first and second projections comprise first and second pairs of spaced projections for seating the annular rim of the existing mirror housing at two positions above and two positions below the existing mirror. Each projection includes a depending portion which extends from a second side of a support arm toward the other supprt arm substantially in alignment with first surface to define with the first surface a first seating surface, and an extending portion which extends outwardly from the outer end of the depending portion beyond the first side of the support arm to define a second seating surface substantially perpendicular to the first seating surface. The first and second seating surfaces define the generally L-shaped seat for engaging and seating portions of the annular rim of the existing mirror housing above and below the existing mirror. The L-shaped configuration of the projections permits the apparatus to properly seat existing mirror members irrespective of the thickness of the annular rim defined by the existing mirror housing.

The securing means preferably comprises a pair of flexible straps which are secured to one support arm and which are adapted to be extended around the back side of the existing mirror housing, extended through slots in the second support arm, and then pulled tightly of firmly secure the auxiliary mirror apparatus to the existing mirror member. The flexible straps are of sufficient length to permit the straps to be extended around existing mirror members of substantially any size or shape that are likely to be encountered, and are adjustable in length from the first support arm to the second support arm to permit the straps to be pulled tightly around existing mirror members of substantially any size and shape to firmly secure the auxiliary mirror apparatus to the existing mirror member.

The straps preferably also include a plurality of spaced ridges on one surface thereof to cooperate with the slots in the second support arm for preventing unintentional loosening of the straps.

According to a further aspect of the invention, the auxiliary mirror member comprises an auxiliary mirror supported within an auxiliary mirror housing. The auxiliary mirror housing defines a back surface which is angled to extend generally outwardly and rearwardly when the auxiliary mirror apparatus is mounted to a vehicle such that during movement of the vehicle, the oncoming wind will strike the back surface at a generally acute angle and be deflected outwardly and rearwardly of the vehicle. The streamlined shape of the auxiliary mirror housing, and of the auxiliary mirror apparatus in general, essentially follows the line along which the existing mirror member extends from the vehicle and significantly reduces vibration of the auxiliary mirror apparatus so as to provide a clear image through auxiliary mirror at substantially all times.

The auxiliary mirror apparatus of the invention can be attached to any existing external mirror of substantially all vehicles. The L-shaped projections and the flexible securing straps permit the apparatus to be mounted to existing mirror housings of diverse thickness, size and shape; and the support arms are both adjustable and flexible to mount the apparatus to existing mirrors of diverse height. The apparatus is attractive in apperance, relatively low in cost and easy to install.

Further advantages and specific details of the invention will become apparent hereinafter in conjunction with the following detailed description of a presently preferred embodiment.

BRIEF DESCRIPTION OF THE DRAWINGS

FIG. 4 is a front perspective view of the apparatus of FIGS. 1-3 mounted to an existing external mirror of a vehicle;

FIG. 5 is a partial cross-sectional view of the apparatus of FIGS. 1-4 looking in the direction of arrows 5—5 in FIG. 1, and mounted to an existing external mirror of a vehicle; and FIG. 6 is a partial cross-sectional view of the apparatus of FIGS. 1-5 looking in the direction of arrows 6-6 in FIG. 1.

DETAILED DESCRIPTION OF THE PREFERRED EMBODIMENT

Figure 1:
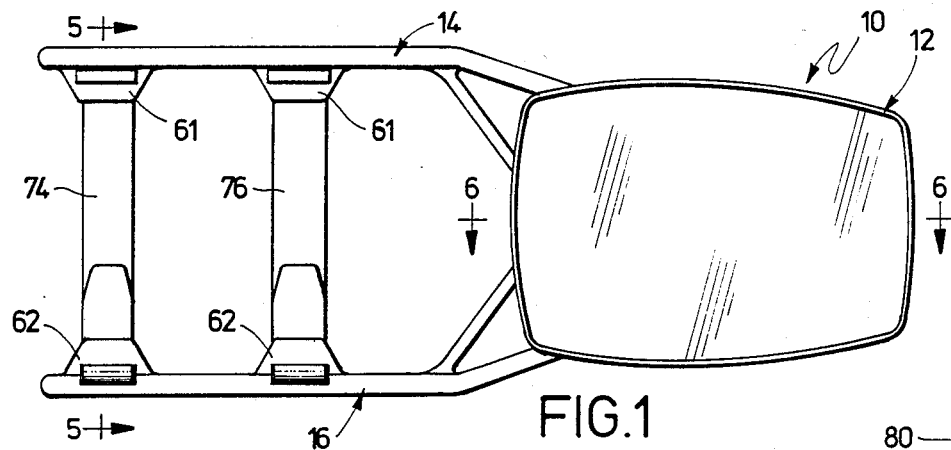
FIG. 1 is a front elevational view of an auxiliary external rearview mirror apparatus according to a presently preferred embodiment of the invention.

FIGS. 1-6 illustrate an auxiliary, external rearview mirror apparatus for motor vehicles according to a presently preferred embodiment of the invention. The auxiliary mirror apparatus is generally designated by reference numeral 10 and comprises an auxiliary mirror member 12 and first and second support arms 14 and 16 for attaching the auxiliary mirror member to an existing external mirror member of a vehicle.

Figure 2:
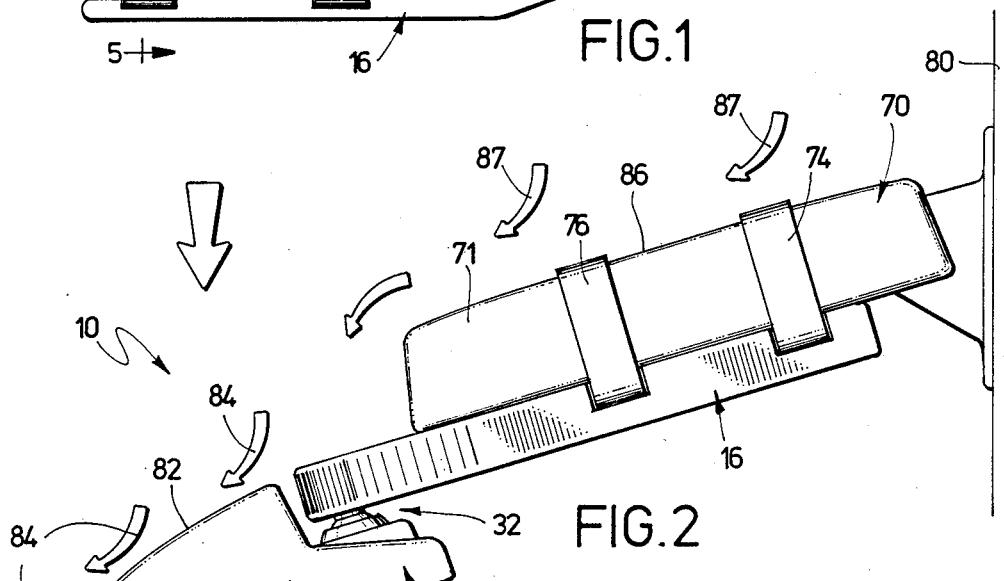
FIG. 2 is a top view of the apparatus of FIG. 1 mounted to an existing external mirror of a vehicle.

Auxiliary mirror member 12 comprises an auxiliary mirror 18 supported within an auxiliary mirror housing 20. Auxiliary mirror 18 may be flat or of convex curvature as known to those skilled in the art, and is mounted within auxiliary mirror housing 20 in any suitable manner. As best shown in FIGS. 2 and 4, auxiliary mirror housing 20 comprises a molded plastic housing formed to have an inner section 22 at which the support arms are attached, and a generally streamlined outer section 24 which will be described in greater detail hereafter.

Support arms 14 and 16 are attached to auxiliary mirror member 12 by a universal mounting generally designated by reference numeral 32. More particularly, and as shown in FIG. 6, mounting section 22 of auxiliary mirror housing 20 is formed to have a generally spherical-shaped recess 40 which is adapted to receive a generally spherical, ball-shaped element 42 that is capable of moving universally within recess 40. A cylindrical-shaped projection 44 extends outwardly from ball element 42 and is adapted to extend through aligned apertures 46 and 48 adjacent the ends of support arms 14 and 16, respectively. A self-tapping screw 50 or the like is extended axially into projection 44 as shown in FIG. 6 to secure the support arms to the ball element.

Figure 3:
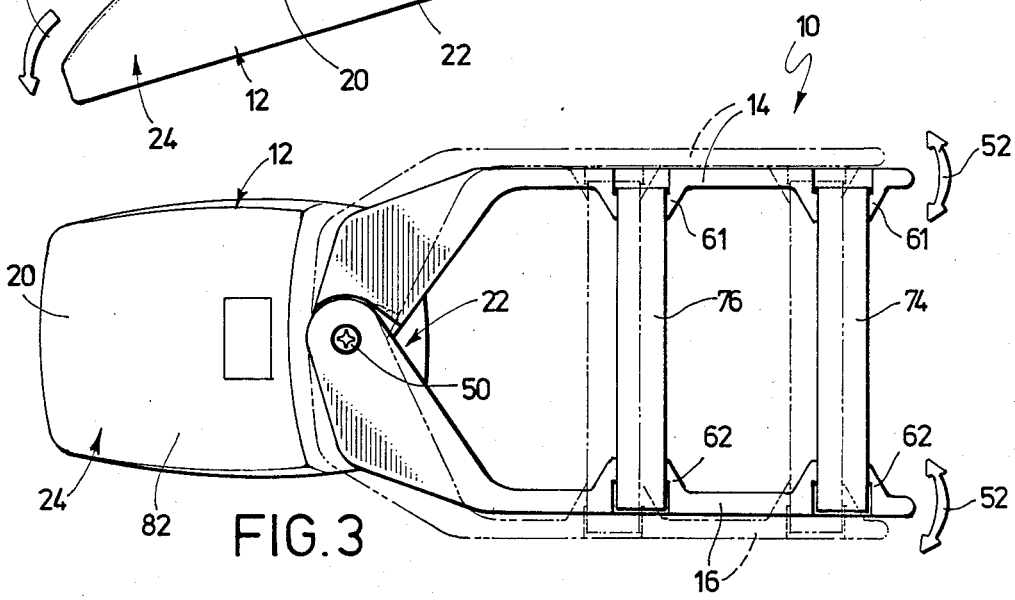
FIG. 3 is a back view of the apparatus of FIGS. 1 and 2.

Universal mounting 32 permits auxiliary mirror housing 20 to be tilted in various directions relative to the support arms to permit the auxiliary mirror 18 mounted therein to be oriented as desired for proper viewing. In addition, the support arms 14 and 16 are pivotally mounted to mirror member 12 to permit the free ends of the arms to be adjusted closer together or farther apart as indicated by arrows 52 in FIG. 3 to permit apparatus 10 to be mounted to existing external mirrors of different size. FIG. 3 illustrates two positions of arms 14 and 16 in solid and dashed line, respectively.

First and second support arms 14 and 16 include first and second pairs of projections 61 and 62, respectively, formed integrally thereon. Each of the projections 61 and 62 is substantially identical, and as shown in FIGS. 4 and 5, includes a depending portion 63 which extends from the inner side of its respective support arm in a direction generally toward the other support arm, and an extended portion 64 which extends substantially perpendicularly from the outer end of the depending portion in a direction toward the rear of the mirror apparatus. The depending portion 63 is generally in alignment with the rear side 66 of the support arms 14 and 16, and defines with the rear side 66 a first seating surface 68, and the extended portions 64 extend rearwardly of the support arms beyond the rear side 66 thereof to define a second seating surface 69. As best shown in FIG. 5, seating surfaces 68 and 69 form a generally L-shaped seat designated by reference number 67 which is adapted to receive and seat the existing external mirror structure of a vehicle to mount the auxiliary mirror apparatus 10 to the vehicle.

More particularly, as shown in FIGS. 4 and 5, an existing external mirror member 70 on a vehicle typically includes an existing mirror housing 71 having an existing rearview mirror 72 mounted therein. Usually, the existing mirror is somewhat recessed within the existing mirror housing as shown in FIGS. 4 and 5 to define an annular rim 73 on the housing which surrounds the existing mirror. The extended portions 64 of the L-shaped seats 67 defined by the projections 61 and 62 are adapted to extend into the recessed housing such that the second seating surfaces 69 thereon bear against annular internal surface 75 of annular rim 73 above and below existing mirror 72, and the outer edge of rim 73 bears against the first seating surface 68. In essence, the L-shaped seats seat the annular rim 73 of existing mirror housing 71 at two locations above and two locations below the existing miror to mount support arms 14 and 16 of apparatus 10 to existing mirror member 70.

To secure auxiliary rearview mirror apparatus 10 to existing mirror member 70, apparatus 10 further includes a pair of flexible straps 74 and 76. One end of the flexible straps 74 and 76 are secured to one of the support arms 14, and the other end of the straps are adapted to be extended around the back side 86 of the existing mirror housing, inserted through slots 78 in the other support arm 16 (see FIG. 4) and then pulled tightly as shown in FIG. 5 to firmly secure the auxiliary mirror apparatus 10 to the existing mirror member 70. As shown in FIG. 5, a surface of the flexible straps is preferably formed with a plurality of spaced ridges 79 which cooperate with slots 78 to help maintain the straps tightly secured around the existing mirror member.

As shown in FIG. 4, when the auxiliary rearview mirror apparatus of the present invention is mounted to an existing mirror member of a vehicle, the existing mirror remains substantially fully uncovered by the apparatus and can continue to be used for viewing by the driver or other occupant of the vehicle. The projections 61 and 62 engage the housing 71 of the existing mirror above and below the existing mirror without blocking the existing mirror to any significant extent, and the straps 74 and 76 extend around the back of the existing mirror member and also do not cover the existing mirror.

The L-shaped configuration of projections 61 and 62 in conjunction with the flexible straps 74 and 76 permits the auxiliary rearview mirror apparatus 10 to be mounted to existing mirror members of substantially any size or shape. This is best illustrated in FIG. 5 wherein the housing 71 of the existing mirror member defines a substantially thick annular rim 73. Because of the L-shaped configuration of the projections 61 and 62, and because the extended portions 64 of the projections extend rearwardly beyond the back side 66 of the support arms, thick existing mirror housings can be properly seated in the L-shaped seat in a firm, reliable manner. The ability to adjust the length of the flexible straps from the first support arm to the second support arm also permits apparatus 10 to be reliably secured to existing mirror members of diverse sizes and shapes by simply pulling the straps tightly around the existing mirror housing as shown in FIG. 5.

In order to use the auxiliary external rearview mirror apparatus 10 of the present invention, the projections 61 and 62 on the support arms 14 and 16 of the apparatus are positioned to seat the upper and lower edges of the existing mirror housing 71 in the L-shaped seats 67. The support arms can easily be pivoted as required around screw 50 to properly position the projections relative to the existing mirror member. The straps 74 and 76 are then extended around the back of the existing mirror member, inserted through the slots 78 in the support arm 16, and pulled tightly, as shown in FIG. 5, until the auxiliary mirror apparatus is firmly secured to the existing mirror member.

The support arms 14 and 16 are of one-piece construction and are preferably formed of a somewhat flexible, molded plastic material. Accordingly, they are capable of bending somewhat to extend substantially parallel to one another above and below the existing mirror when the straps are tightened. The flexible nature of the support arms in the apparatus of the present invention makes it unnecessary to from the support arms in two or more articulated sections to achieve a proper fit with the diverse existing mirror members on different vehicles; thus, simplifying the construction of the apparatus and reducing manufacturing costs.

As best shown in FIG. 2, when the apparatus 10 is mounted to an existing mirror member 70 the auxiliary mirror member 12 and the auxiliary mirror 18 carried therein extends outwardly from the side of vehicle 80 beyond the existing mirror 70. The streamlined section 24 of housing 20 of auxiliary mirror member 12 is of generally tapered shape, and includes a back housing surface 82 which will be the forwardly facing surface of the housing when the auxiliary mirror apparatus is mounted to a vehicle and which is angled outwardly and rearwardly relative to the vehicle such that the oncoming wind striking surface 82 during movement of the vehicle will tend to strike the surface at a generally acute angle and be deflected outwardly and rearwardly along the surface 82 as shown by arrows 84. In addition, mirror apparatus 10 is mounted to existing mirror 70 such that it essentially follows the line along which the existing mirror member extends from the vehicle and the back surface 82 of the auxiliary mirror housing comprises substantially a continuation of the forwardly facing back surface 86 of the existing mirror housing. As a result, and as shown in FIG. 2, wind striking the existing mirror member will also be deflected outwardly and rearwardly as shown by arrows 87 and be deflected along surface 82 of the auxiliary mirror apparatus away from the vehicle.

Because of the streamlined construction of the auxiliary mirror apparatus, the auxiliary mirror apparatus is able to withstand the force of the oncoming wind while the vehicle is in motion without vibrating to any significant extent. A clear image will thus be provided by the auxiliary mirror at substantially all times. Because the auxiliary mirror member will not vibrate to any significant extent, it will also not transmit any significant vibration to the existing mirror member, and the existing mirror will also remain substantially free from vibration and provided a clear view.

While what has been disclosed constitutes a presently preferred embodiment of the invention, it should be understood that the invention could take numerous other forms. Accordingly, it should be recognized that the invention should be limited only insofar as is required by the scope of the following claims.

We claim:

1. An auxiliary external rearview mirror apparatus which is adapted to be mounted to an existing external mirror member of a vehicle, said existing mirror member including a mirror side having an existing mirror, and a back side, said apparatus comprising:

an auxiliary mirror member;

first and second support arms extending from said auxiliary mirror member for mounting said auxiliary mirror member to an existing extenal mirror member on a vehicle, said first and second support arms being adapted to engage the mirror side of said existing mirror on opposite sides of said existing mirror; and securing means for securing the auxiliary mirror apparatus to the existing mirror member, said first and second support arms including a first side which faces the mirror side of the existing mirror member when the first and second support arms are mounted to the existing mirror member, and first and second projections extending from the first and second support arms, respectively, the first and second projections each including a depending portion which extends from a second side of its respective support arm in a direction generally towards the other support arm and which includes a surface which is substantially aligned with said first side of its respective support arm to define with the first side of its respective support arm a first seating surface to seat the mirror side of the existing mirror member, and an extending portion which extends outwardly from the depending portion beyond the first side of the support arm to define a second seating surface to seat the mirror side of the existing mirror member, the first and second seating surface of each support arm defining first and second generally L-shaped seats for seating the mirror side of the existing mirror member on opposite sides of the existing mirror.

2. The auxiliary mirror apparatus of claim 1 wherein the existing mirror member includes an existing mirror housing and said existing mirror is recessed within the existing mirror housing to define a substantially annular existing mirror hoousing rim around the existing mirror, and wherein said first and second generally L-shaped seats are adapted to seat said substantially annular rim above and below said existing mirror.

3. The apparatus of claim 2 wherein said first and second projections comprise first and second pairs of spaced projections, respectively, for defining first and second pairs of L-shaped seats on said first and second support arms, respectively.

4. The apparatus of claim 1 wherein said auxiliary mirror member includes an auxiliary mirror housing and an auxiliary mirror supported within said auxiliary mirror housing, said auxiliary mirror housing being of tapered design to define a back surface thereof which faces substantially forwardly of a vehicle when the auxiliary mirror apparatus is mounted to a vehicle, and which is angled generally outwardly and rearwardly relative to said vehicle such that wind striking said back surface when said vehicle is in motion will impinge upon said back surface at a generally acute angle and be deflected outwardly and rearwardly of said vehicle to provide a substantially streamlined surface.

5. The apparatus of claim 1 wherein said first and second support arms are pivotally mounted to said auxiliary mirror member and are of one-piece construction and somewhat flexible to permit said support arms to deform to extend substantially parallel to one another above and below an existing mirror member when said auxiliary mirror apparatus is mounted to an existing mirror member.

6. An auxiliary external rearview mirror apparatus which is adapted to be mounted to an existing external mirror member of a vehicle, comprising: an auxiliary mirror member, and means for mounting said auxiliary mirror member to an existing mirror member of said vehicle, said auxiliary mirror member being of tapered design to define an angled back surface which is adapted to face forwardly when said auxiliary mirror apparatus is mounted to said existing mirror member, said back surface being angled to extend generally outwardly and rearwardly relative to said vehicle whereby wind impinging upon said back surface will strike said back surface at a generally acute angle and be deflected outwardly and rearwardly away from said vehicle to provide a substantially streamlined surface for reducing vibration of said auxiliary mirror member.

7. The apparatus of claim 6 wherein support means mounts said auxiliary mirror member to said existing mirror member such that the auxiliary mirror member follows substantially the same line along which the existing mirror member extends from said vehicle.

8. The apparatus of claim 7 wherein said support means comprises first and second support arms adapted to engage the existing mirror member above and below an existing mirror therein without blocking the view of the existing mirror to any significant extent.

9. The apparatus of claim 6 wherein said auxiliary mirror member comprises an auxiliary mirror housing and an auxiliary mirror supported by the auxiliary mirror housing, said back surface of said auxiliary mirror member comprising the back surface of said auxiliary mirror housing.

10. An auxiliary external rearview mirror apparatus which is adapted to be mounted to an existing external mirror member of a vehicle, said existing mirror member having a mirror side and a back side, and including an existing mirror housing and an existing mirror recessed within the housing to define an annular existing mirror housing rim around the existing mirror, the auxiliary mirror comprising:

an auxiliary mirror member;

first and second support arms extending from said auxiliary mirror member for mounting said auxiliary mirror member to an existing mirror member on a vehicle, said first and second support arms having a first side which faces the mirror side of the existing mirror member when the first and second support arms are mounted to the existing mirror member, and first and second projections extending from the first and second support arms, respectively, for engaging the annular rim of the existing mirror housing above and below the existing mirror, the first and second projections each including a depending portion extending outwardly from a second side of its respective support arm generally toward the other support arm and which inculdes a surface which is substantially aligned with said first side of its respective support arm for defining with said first side of its respective support arm a first seating surface, and an extending portion extending outwardly from the end of the depending portion beyond said first side of its respective support arm for defining a second seating surface, said first and second seating surfaces of each support arm defining generally L-shaped seats for engaging and seating the annular rim of the existing mirror housing above and below existing mirror; and securing means adapted to extend around the back side of the existing mirror member from the first support arm to the second support arm to secure the auxiliary mirror apparatus to the existing mirror member, said securing means being both flexible and of adjustable length between said first and second support arms to firmly secure the auxiliary mirror member to existing mirror members of diverse size and shape.

11. The auxiliary mirror apparatus of claim 10 wherein said auxiliary mirror member is of streamlined shape and includes a back surface which substantially faces the oncoming wind when the auxiliary mirror apparatus is mounted to an existing mirror member of a vehicle, at least a substantial portion of said back surface being angled to extend generally outwardly and rearwardly relative to said vehicle whereby the oncoming wind will strike said back surface at substantially an acute angle and be deflected outwardly and rearwardly away from said vehicle.

12. The auxiliary mirror apparatus of claim 10 wherein said first and second support arms are pivotally mounted to said auxiliary mirror member and are of one-piece construction and somewhat flexible to permit said support arms to deform to extend substantially parallel to one another above and below said existing mirror member when said auxiliary mirror apparatus is mounted to an existing mirror member.

13. The auxiliary mirror apparatus of claim 10 wherein said securing means comprises a pair of flexible straps having one end secured to said first support arm and the other end adapted to be extended around the back side of the existing mirror member, extended through slots in the second support arm and pulled tightly to secure the auxiliary mirror apparatus to the existing mirror member.

14. An auxiliary external rearview mirror apparatus which is adapted to be mounted to an existing external mirror member of a vehicle, said existing mirror member including a mirror side having an existing mirror, and a back side, said apparatus comprising:

an auxiliary mirror member;

first and second support arms extending from said auxiliary mirror member for mounting said auxiliary mirror member to an existing external mirror member on a vehicle, said first and second support arms being adapted to engage the mirror side of said existing mirror member on opposite sides of said existing mirror; and a pair of flexible straps adapted to be extended around the back side of the existing mirror member from the first support arm to the second support arm to secure the auxiliary mirror apparatus to the existing mirror member, each of said flexible straps having one end secured to said first support arm and the other end adapted to be extended around the back side of the existing mirror member and to be extended through a slot in the second support arm to secure the auxiliary mirror apparatus to the existing mirror member, each of said flexible straps including a surface having a plurality of ridges thereon for cooperating with its respective slot for retaining said straps tightly secured around said existing mirror member, said first and second support arms including a first side which faces the mirror side of the existing mirror member when the first and second support arms are mounted to the existing mirror member, and first and second projections extending from the first and second support arms, respectively, for engaging the mirror side of the existing mirror member on opposite sides of the existing mirror, the projections each including a depending portion which extends outwardly from its respective support arm and an extending portion which extends outwardly from the depending portion beyond the first side of the support arm to define generally L-shaped seats for engaging the mirror side of the existing mirror member on opposite sides of the existing mirror.

15. An auxiliary external rearview mirror apparatus which is adapted to be mounted to an existing external mirror member of a vehicle, said existing mirror member including a mirror side having an existing mirror and a back side, said apparatus comprising:

an auxiliary mirror member;

first and second support arms extending from said auxiliary mirror member for mounting said auxiliary mirror member to an existing external mirror member on a vehicle, said first and seocnd support arms being adapted to engage the mirror side of said existing mirror member on opposite sides of said existing mirror; and at least one flexible strap having one and secured to said first support arm and the other end thereof adapted to be extended around the back side of the existing mirror member and extended through a slot in the second support arm and pulled tightly to secure the auxiliary mirror apparatus to the existing mirror member, said at least one flexible strap being adjustable in length from said first support arm to said second support arm to secure said auxiliary mirror apparatus to existing mirror members of diverse size and shape, and including a surface having a plurality of ridges thereon for cooperating with said slot for retaining said strap tightly secured around said existing mirror member.

16. The auxiliary mirror apparatus of claim 15 wherein said at least one flexible strap comprises a pair of spaced straps.

* * * * *

UNITED STATES PATENT AND TRADEMARK OFFICE
CERTIFICATE OF CORRECTION

PATENT NO. : 4,892,400

DATED : January 9, 1990

INVENTOR(S) : Geoffrey S. Brookes and George J. Wyers

It is certified that error appears in the above-identified patent and that said Letters Patent is hereby corrected as shown below:

In col. 2, line 45, change "blow" to --below--.

In col. 2, line 62, change "supprt" to --support--.

In col. 3, line 13, change "of" to --to--.

In col. 3, line 42, after "through", insert --the--.

In col. 3, line 51, change "apperance" to --appearance--.

In col. 6, line 23, change "from" to --form--.

In col. 6, line 64, change "provided" to --provide--.

In col. 7, line 39 (claim 1, line 35), change "surface" to --surfaces--.

In col. 7, line 47, (claim 2, line 5), change "hoousing" to --housing--.

In col 8, line 48 (claim 10, line 8), after "mirror", insert --apparatus--.

In col. 8, line 64 (claim 10, line 24), change "inculdes" to --includes--.

UNITED STATES PATENT AND TRADEMARK OFFICE
CERTIFICATE OF CORRECTION

PATENT NO. :  4,892,400  Page 2 of 2

DATED       :  January 9, 1990

INVENTOR(S) :  Geoffrey S. Brookes and George J. Wyers

It is certified that error appears in the above-identified patent and that said Letters Patent is hereby corrected as shown below:

In col. 10, line 37 (claim 15, line 10), change "seocnd" to --second--.

Signed and Sealed this

Twenty-second Day of January, 1991

Attest:

HARRY F. MANBECK, JR.

*Attesting Officer*      *Commissioner of Patents and Trademarks*